United States Patent
Lang et al.

(10) Patent No.: US 12,122,130 B2
(45) Date of Patent: Oct. 22, 2024

(54) THERMAL VACUUM INSULATION ELEMENT

(71) Applicant: V21 GmbH, Hamburg (DE)

(72) Inventors: Malte Lang, Dahlem (DE); Roland Wiedenroth, Hamburg (DE)

(73) Assignee: V21 GmbH, Hamburg (DE)

( * ) Notice: Subject to any disclaimer, the term of this patent is extended or adjusted under 35 U.S.C. 154(b) by 55 days.

(21) Appl. No.: 18/010,867

(22) PCT Filed: Jun. 28, 2021

(86) PCT No.: PCT/EP2021/067685
§ 371 (c)(1),
(2) Date: Dec. 16, 2022

(87) PCT Pub. No.: WO2022/008281
PCT Pub. Date: Jan. 13, 2022

(65) Prior Publication Data
US 2023/0234324 A1 Jul. 27, 2023

(30) Foreign Application Priority Data

Jul. 10, 2020 (EP) .................................... 20185224

(51) Int. Cl.
*F16L 59/065* (2006.01)
*B32B 3/08* (2006.01)
(Continued)

(52) U.S. Cl.
CPC ............... *B32B 3/08* (2013.01); *B32B 3/266* (2013.01); *B32B 5/02* (2013.01); *B32B 2250/40* (2013.01);
(Continued)

(58) Field of Classification Search
None
See application file for complete search history.

(56) References Cited

U.S. PATENT DOCUMENTS 6,037,033 A 3/2000 Hunter

FOREIGN PATENT DOCUMENTS

DE 10119037 A1 * 10/2002 ............ F16L 59/065
DE 102007056837 A1 5/2009
(Continued)

OTHER PUBLICATIONS

Machine translation of DE10119037A1. (Year: 2024).*
European Patent Office, International Search Report in corresponding PCT/EP2021/067685, Sep. 24, 2021, 7 pages.
(Continued)

*Primary Examiner* — Alexander S Thomas
(74) *Attorney, Agent, or Firm* — Hooker & Habib, P.C.

(57) ABSTRACT

A thermal vacuum insulation element (10) comprising a first planar limiting part (12) and a second planar limiting part (14). The limiting parts are spaced apart from each other and define an evacuated space (16) between them. The evacuated space (16) is sealed by means (26) for sealing. The vacuum insulation element includes first support elements (18) extending away from the first limiting part (12) into the evacuated space (16) and second support elements (20) extending away from the second limiting part (14) into the evacuated space (16), the limiting parts (12, 14) being arranged with the support elements (18, 20) such that the first support elements (18) and the second support elements (20) protrude beyond and are spaced from each other. The first support elements (18) are spaced from the second limiting part (14), and the second support elements (20) are spaced from the first limiting part (12). A fiber structure (22) interconnects the first support elements (18) and the second support elements (20). The fiber structure (22) has a low thermal conductivity and is configured to absorb at least the pressure caused by the vacuum on the first and second limiting parts (12, 14).

19 Claims, 3 Drawing Sheets

Figure 1:
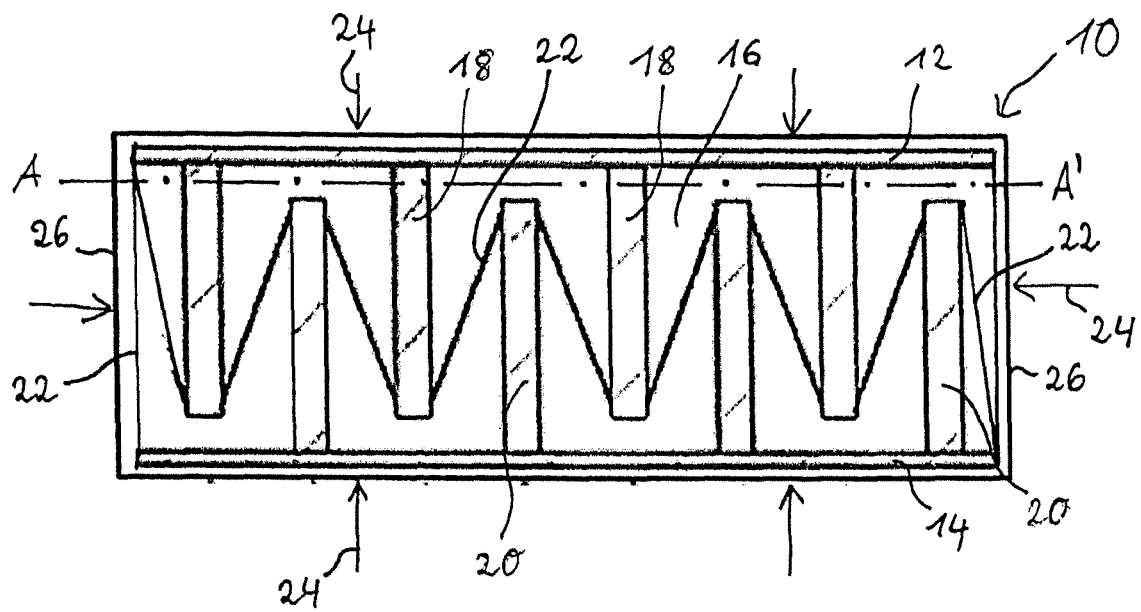

(51) Int. Cl.
 B32B 3/26 (2006.01)
 B32B 5/02 (2006.01)
(52) U.S. Cl.
 CPC .............. *B32B 2262/0261* (2013.01); *B32B 2262/0269* (2013.01); *B32B 2262/065* (2013.01); *B32B 2262/101* (2013.01); *B32B 2262/106* (2013.01); *B32B 2307/304* (2013.01); *B32B 2435/02* (2013.01); *F16L 59/065* (2013.01); *Y10T 428/231* (2015.01)

(56) References Cited

FOREIGN PATENT DOCUMENTS

| | | |
|---|---|---|
| EP | 2462372 A2 | 6/2012 |
| JP | S5397662 A | 8/1978 |
| WO | 2011050800 A2 | 5/2011 |

OTHER PUBLICATIONS

Google Translate English-Language Machine Translation of Written Opinion Portion of International Search Report in in corresponding PCT/EP2021/067685, 2 pages.
European Patent Office, English-Language Machine Translation of Specification of DE102007056837A1, 9 pages.
European Patent Office, English-Language Machine Translation of Specification of WO2011050800A2, 84 pages.
European Patent Office, English language translation of Internatonal Preliminary Report on Patentabilty in corresponding PCT/EP2021/067685, Jan. 10, 2023, 5 pages.
Japan Patent Office, Office Action in corresponding Japanese application 2023-501225, Feb. 6, 2024, 6 pages.
English language translation of Japan Patent Office Office Action dated Feb. 6, 2024, 4 pages.
European Patent Office, English language machine translation of specification and claims of JPS5397662A, 5 pages.

* cited by examiner

THERMAL VACUUM INSULATION ELEMENT

The present invention relates to a thermal vacuum insulation element.

The high achievable insulation effect of thermal vacuum insulation elements is due to the lack of thermal conductivity of vacuum. Without particles, no heat transport can take place. The remaining actual heat conduction takes place via a support core, which mechanically stabilizes the vacuum insulation element, and via edges of the vacuum insulation element, which laterally limit the evacuated space.

Conventionally, vacuum insulation elements consist of an open-pored support core wrapped in several layers of metallized plastic film. The material of the support core should itself have a low thermal conductivity. Known support cores are often made of a powdered insulating material such as, for example, fumed silica. Glass fiber nonwovens are known as another core material.

Applications of vacuum insulation panels are, for example, in the field of refrigerators and freezers as well as in the field of hot water storage tanks. Further known applications are in the field of building insulation. In general, thermal insulation panels can be used wherever high thermal insulation is required with a low thickness of the insulation layer.

A disadvantage of currently known vacuum insulation panels is the very energy-intensive and expensive production of the supporting core. In addition, the panels are very sensitive, as only an uninsulationaged plastic film guarantees the vacuum.

For these and other reasons, there is a need for the present invention. It may be an objective of the invention to provide a vacuum insulation panel whose production requires less energy. It may be an objective of the invention to provide a more robust vacuum insulation panel. It may be an objective of the invention to provide a vacuum insulation panel that is fully recyclable.

Figure 2:
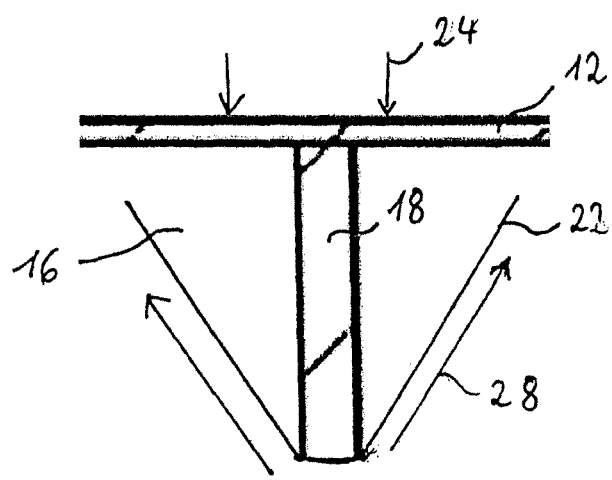
Figure 3:
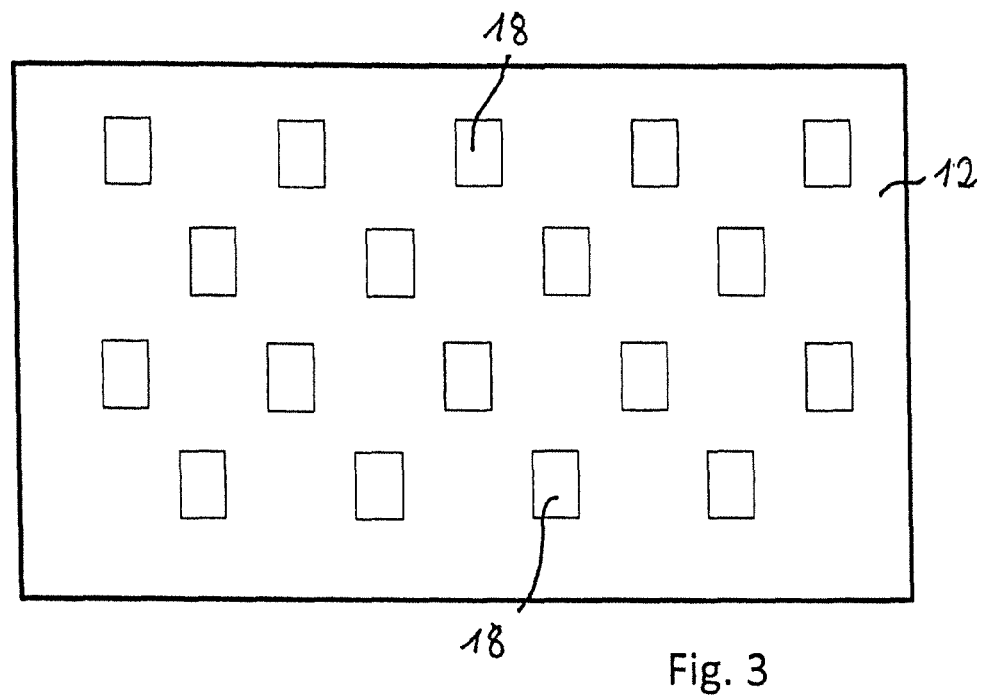
Figure 4:
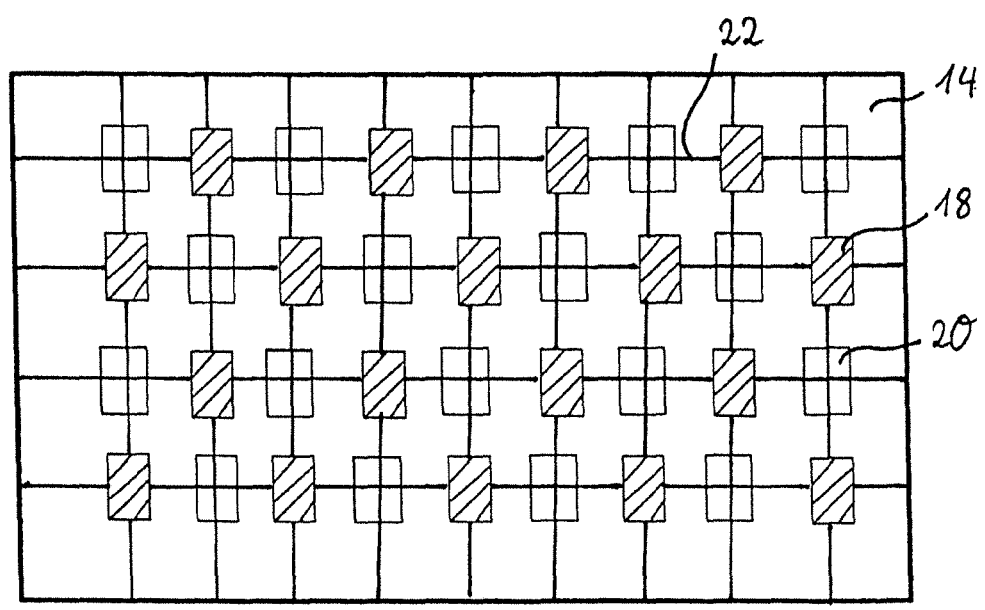

The objectives and features of the present invention will become clear in the following description of embodiments, which is made with reference to the accompanying figures, in which:

FIG. 1 schematically shows a side view of a thermal vacuum insulation element according to the invention;

FIG. 2 schematically shows a force transmission in the thermal vacuum insulation element of FIG. 1 according to the invention;

FIG. 3 schematically shows a top view of a limiting part according to the invention with support elements;

FIG. 4 schematically shows a section along the line A-A' in FIG. 1; and

Figure 5:
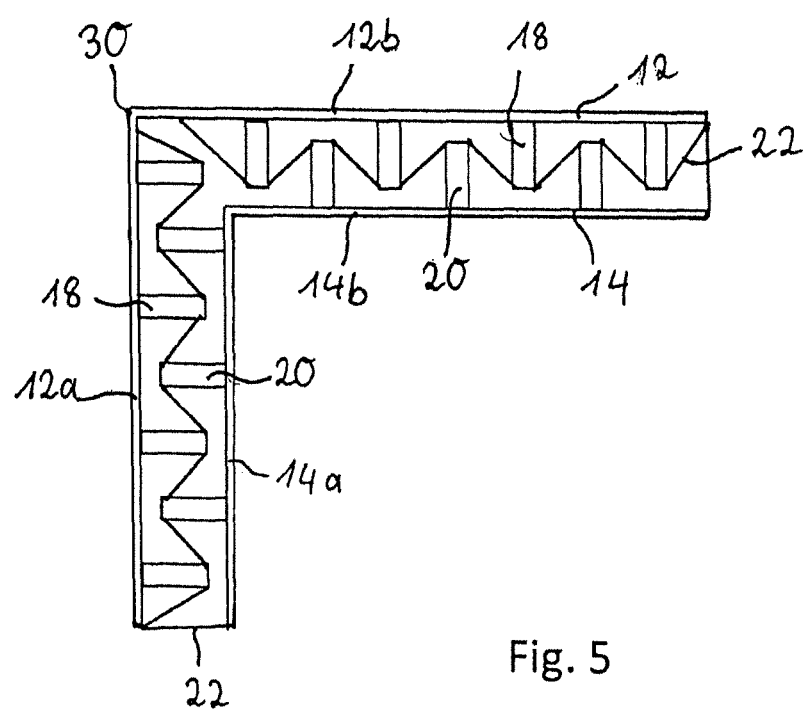

FIG. 5 schematically shows a side view through a vacuum insulation element according to the invention, forming an edge.

In the following, with reference to the drawings, aspects and embodiments are described, wherein the same or similar reference signs are generally used to refer to the same or similar elements. In the following description, numerous specific details are set forth to provide a thorough understanding of one or more aspects of the embodiments. However, it may be apparent to one skilled in the art that one or more aspects of the embodiments may be carried out with a lesser degree of the certain details. In further instances, elements are shown in schematic form to facilitate description of one or more aspects of the embodiments. Accordingly, the following description is not intended to be limiting. It is noted that the representation of the various elements in the figures is not necessarily to scale.

Directional terminology used in the description with reference to the drawings, such as "top", "bottom", "top side", "bottom side", "left", "right", "front side", "back side", "vertical", "horizontal", etc., is not intended to be limiting. Components of embodiments may be positioned in a number of different orientations and the direction terminology is used for explanatory purposes only. It is understood that further embodiments may be used and structural or logical changes may be made without departing from the concept of the present invention.

FIG. 1 shows, highly schematized, a side view of a thermal vacuum insulation element 10 according to the invention. The vacuum insulation element 10 may include a first planar limiting part 12 and a second planar limiting part 14. The limiting part 12 and the limiting part 14 define an evacuated space 16 between them. The first planar limiting part 12 and the second planar limiting part 14 may be arranged parallel to each other. The first planar limiting part 12 and the second planar limiting part 14 may be spaced apart from each other. From the first limiting part 12 to the second limiting part 14, heat transfer is to be minimized.

First support elements 18 extend away from the first limiting part 12 into the evacuated space 16. Second support elements 20 extend away from the second limiting part 14 into the evacuated space 16. The limiting parts 12, 14 with the support elements 18, 20 are arranged relative to each other such that the first support elements 18 and the second support elements 20 protrude beyond each other and are spaced apart from each other.

The first support elements 18 extend toward the second limiting part 14. The first support elements 18 do not touch the second limiting part 14. The second support elements 20 extend toward the first limiting part 12. The second support elements 20 do not touch the second limiting part 14. The first support elements 18 may be formed from one piece with the first limiting part 12. The second support elements 20 may be formed from one piece with the second limiting part 14.

In one embodiment, the first limiting part 12 together with the first support elements 18 may be formed as an undulating or corrugated component. In an embodiment, the second limiting part 14 with the second support elements 20 may also be embodied as an undulating or corrugated component. A plurality of corrugations may be provided.

The vacuum insulation element 10 includes a fiber structure 22. The fiber structure 22 connects the first support elements 18 and the second support elements 20 to each other in the vacuumed space 16. The fiber structure 22 may be fixed or attached to at least one of the first support elements 18, at least one of the second support elements 20, the first limiting part 12, and/or the second limiting part 14. An upper portion of the vacuum insulation element comprising the first limiting part 12 and the first support elements 18 is connected to a lower portion of the vacuum insulation element comprising the second limiting part 14 and the second support elements 20 via the fiber structure 22. The fiber structure 22 has a low thermal conductivity. The fiber structure 22 is configured to at least absorb pressure caused by the vacuum on the first limiting part 12 and the second limiting part 14. The fiber structure 22 may further be configured to absorb further force applied to the vacuum insulation element 10 due to a use of the vacuum insulation element 10. The force applied to the limiting parts 12, 14 due to the prevailing vacuum as a result of the ambient pressure is symbolically represented by arrows 24.

The vacuum insulation element 10 may include means 26 for sealing the evacuated space 16, which are explained in more detail below.

Heat conduction from the first limiting part 12 to the second limiting part 14 can only occur via the fiber structure 22, the means 26 for sealing limiting parts 26, and the evacuated space 16, i.e., via gas atoms and gas molecules remaining in the imperfect vacuum. The inventors were hereby able to demonstrate heat transfer in a range of only $10^{-5}$ W/mK.

With reference to FIG. 2, the interaction between the support elements 18, 20 and the fiber structure 22 becomes clear. FIG. 2 shows a small section of the vacuum insulation element 10 of FIG. 1, with arrows 24 showing the force acting on the limiting part 12 due to the vacuum prevailing in the space 16. The force 24 is transmitted to the support element 18 shown and is absorbed by the fiber structure 22. Due to the support elements 18, 20 protruding past each other, a force redirection of the external pressure load to a tension load of the fibers of the fiber structure 22 is achieved. The obliquely arranged fiber structure 22 further absorbs any also occurring transverse forces.

The limiting parts 12, 14 may define an upper surface and a lower surface of the vacuum insulation element 10. The vacuum is formed between the first planar limiting part 12 and the second planar limiting part 14. The first limiting part 12 and the second limiting part 14 are spaced apart from each other and may be substantially parallel to each other. The limiting parts 12, 14 may be made of material suitable for high vacuum. The thermal conductivity of the limiting parts 12, 14 is irrelevant for the thermal conductivity of the vacuum insulation element since they do not touch each other. The limiting parts 12, 14 may be made of metal. The limiting parts 12, 14 may be made of stainless steel. The limiting parts 12, 14 may be made of ceramic, glass, laminate, and/or plastic. The limiting parts 12, 14 may comprise or be made of a metal-coated fiber laminate.

The limiting parts 12, 14 may be flat and each lie entirely in a plane. In this way, panels can be formed. The panels may be used, for example, for building insulation. The panels can be laid in multiple layers. In this case, the individual panels of the successive layers can be arranged offset from one another, such that abutting edges of different layers do not come to lie on top of one another. In other words, the plates can be arranged one above the other in a brick-like manner.

In other embodiments, the limiting parts 12, 14 may assume any desired shape. The limiting parts 12, 14 may be curved. In one embodiment, the limiting parts 12, 14 may comprise an edge, as explained in more detail with reference to FIG. 5. In one embodiment, the limiting parts 12, 14 may form a corner. The limiting parts 12, 14 may be designed for the particular application. If only flat panels are used to insulate a room, for example, thermal bridges are inevitably created at the edges, since a lower limiting part 14 of a first panel contacts an upper limiting part of a second panel at the edge. The proposed design of the limiting parts 12, 14 as an edge or as a corner allows (room) insulation without the formation of thermal bridges.

The limiting parts 12, 14 can each be full-faced, for example made of a continuous stainless steel plate. A stainless steel plate is inexpensive to manufacture and can be fully recycled at the end of the service life of the insulation element. The recycling rate is very good. A full-faced embodiment may increase a mechanical resistance of the vacuum insulation element 10.

In other embodiments, at least one of the limiting parts 12, 14 may have openings or apertures. At least one of the limiting parts 12, 14 may be formed of wire. It may be formed in a lattice shape. At least one of the limiting parts 12, 14 may be formed as a profiled structure. Such a structure with openings may have a lower weight. Such a structure with openings may use less material. For larger openings, the limiting parts may be spanned by the fiber structure 22.

The means 26 for sealing the evacuated space 16 may surround the entire vacuum insulation element 10 as shown in FIG. 1. The means 26 for sealing the evacuated space 16 may be a foil bag, in particular a metallized foil bag.

The means 26 for sealing the evacuated space 16 may extend only along the edges of the opposing limiting parts 12, 14. The means 26 for sealing the evacuated space 16 may be directly connected to the limiting parts 12, 14 along the edges thereof in a diffusion-tight manner. The means 26 for sealing the evacuated space 16 may be bonded or welded to the limiting parts 12, 14. The means 26 for sealing the evacuated space 16 may be formed on one or both of the limiting parts 12, 14. The means 26 may be formed of the same material as the limiting parts 12, 14.

The means 26 for sealing the evacuated space 16 may be made of diffusion-tight material. The means 26 for sealing the evacuated space 16 may be formed very thinly to minimize heat transfer along the edges. The means 26 for sealing the evacuated space 16 may be formed of thin metal foil. A thickness of the metal foil may be between 2 μm and 50 μm. A thickness of the metal foil may have a different value. The means 26 for sealing the evacuated space 16 may be formed of or include stainless steel foil having a thickness between 5 μm and 20 μm. The means 26 for sealing the evacuated space 16 may comprise glass or metallized plastic film. The edge region of the vacuum insulation element may be reinforced by the fiber structure 22, as can also be seen from FIG. 1. In particular, fibers of the fiber structure 22 may extend in the edge region substantially perpendicular to the limiting parts 12, 14.

The support elements 18, 20 may be attached to the respective limiting parts 12, 14. The first and second support elements may be screwed, soldered, glued, welded, inserted into, clamped into or otherwise secured to the first and second limiting parts 12, 14, respectively. The support elements 18, 20 may be formed from one piece with the respective limiting parts 12, 14. The support elements 18, 20 may be uniformly distributed over the limiting parts 12, 14. The support elements 18 may be mounted on the limiting part 12 in an arrangement that is offset from an arrangement of the support elements 20 on the limiting part 14.

The support elements 18 may have the same shape as the support elements 20. The support elements 18 may differ in shape from the support elements 20.

The support elements 18, 20 may be strip-shaped. The support elements 18, 20 may extend as ribs over an entire extent of the limiting parts 12, 14. The ribs may be formed in a v-shape, wherein the opening of the v may be oriented to face the respective limiting part.

The support elements 18, 20 may be substantially rod-shaped. The rod-shaped support elements 18, 20 may be uniformly distributed in rows and columns over the limiting parts 12, 14. Rod-shaped support elements 18, 20 may have a substantially rectangular ground plan. Rod-shaped support elements 18, 20 may have a substantially square ground plan. Rod-shaped support elements 18, 20 may have a substantially circular or oval ground plan. Rod-shaped support elements 18, 20 may have any desired ground plan. A dimensioning and a number of support elements per limiting part is to a large extent dependent on the materials used, the field of application and possibly additional forces acting on the vacuum insulation element.

The support elements 18, 20 can have guides for the fiber structure 22. The guides may be in the form of notches or grooves. The guides may be in the form of lateral notches. The support elements 18, 20 may have holes as guides. The fiber structure 22 may be fixed to the support elements 18, 20. The support elements 18, 20 may comprise devices for fixing. The devices may be clamping devices.

Via the fiber structure 22, in addition to the edge sealing, a substantial heat transfer takes place between the first limiting part 12 and the second limiting part 14. The fiber structure 22 is therefore configured to have a low thermal conductance. The fiber structure 22 may have a thermal conductivity value of less than 0.06 W/mK. The fiber structure 22 may be formed of glass fiber. The glass fiber may have a thermal conductivity value of about 1 W/mK. The fiber structure 22 may be formed of aramid fiber having a thermal conductivity value of about 0.04 W/mK. The fiber structure 22 may be formed of nylon fiber, hemp fiber, or carbon fiber. The fiber structure may be formed of more than one of said materials. The thermal conductivity is further determined by a cross-section of the fiber structure.

The fiber structure 22 should have a high tensile strength, since a high force is absorbed via the fiber structure 22.

At present, an aramid fiber seems to be particularly suitable. The word aramid stands for aromatic polyamides. These are anisotropic polymer fibers. They have a lower density than glass fibers and exhibit particularly high tensile strength and high toughness. They are very resistant to fatigue. A tensile strength may be about 2800 N/mm$^2$.

The fiber structure 22 may be a fiber strand or filament. As shown in FIG. 1, the filament 22 may have one end attached to the first limiting part 12 and then alternately pass over a first support element 18 and a second support element 20, another first support element 18, another second support element 20, and so on, and be attached to the second limiting part 14.

The fiber structure 22 as a filament may be guided in different directions over the support elements, depending on the arrangement of the first and second support elements.

In other embodiments, the fiber structure 22 may be a fabric. The fabric may cover the entire surface of the limiting parts. In other embodiments, the fiber structure 22 may be implemented as a fabric tape. The fiber structure may be embodied as a braided tape. Various embodiments of the fiber structure 22 may be combined.

The fiber structure 22 may be guided in the edge region and attached to the edges of the limiting parts 12, 14, for example, to reinforce a sealing film 26 in the edge region. The fiber structure 22 may be guided in the edge region substantially perpendicularly from the first limiting part 12 to the second limiting part 14. The fiber structure 22 may extend diagonally in the edge region. The fiber structure may be embodied as a fabric in the edge region and as a filament between the support elements 18, 20.

In one embodiment, the limiting parts 12, 14 may be formed as full-faced stainless steel plates, with a tight fiber covering and a thin stainless steel foil in the edge region, which is connected to the stainless steel plates in a gas-tight manner. The tight fiber covering can be dimensioned to reinforce a very thin stainless steel foil. This can provide a very robust, recyclable vacuum insulation panel.

FIG. 3 shows a top view of the first limiting part 12 according to one embodiment. First rod-shaped support elements 18 are distributed in a regular grid over the entire surface of the limiting part 12. The first support elements 18 are arranged in columns and rows. The cross-section of the first rod-shaped support elements 18 is rectangular in the embodiment shown.

FIG. 4 shows a section along the line A-A' in FIG. 1, looking at the second limiting part 14. The first support elements 18 are cut in this illustration, while looking at the second support elements 20. In the embodiment of FIG. 4, the means 26 for sealing the evacuated space are omitted. In the illustrated embodiment, the fiber structure 22 is formed from individual filaments of, for example, an aramid fiber. The limiting part 14 is rectangular by way of example. The individual filaments of the fiber structure 22 run substantially parallel to the edges of the limiting part 14 and terminate at the edge.

The first support elements 18 and the second support elements 20 protrude beyond each other and are spaced apart from each other. The filaments of the fiber structure 22 cross each other on the support elements 18, 20, and may be guided in or on the support elements at their crossing points (not shown).

FIG. 5 schematically shows a side view through an exemplary vacuum insulation element forming an edge. Both the first limiting part 12 and the second limiting part 14 are designed to form an edge 30. In the illustrated embodiment, a first partial surface 12a of the first limiting part 12 extends at right angles to a second partial surface 12b and thus forms the edge 30. The same applies to the second limiting part 14 with first partial surface 14a and second partial surface 14b.

As a result, contact between the outer or first limiting part 12 and the inner or second limiting part 14 is also avoided in the edge region and no thermal bridges are formed.

The design with first support elements 18 and second support elements 20 as well as fiber structure 22 is analogous to the embodiments described so far and will not be explained in detail.

In one embodiment, a first vacuum insulation element is formed as a container open on one side. For example, the first limiting part 12 and the second limiting part 14 are formed as a cuboid, cube or cylinder open on one side. Again, an evacuated space is defined by the limiting parts, into which support elements 18, 20 protrude as described above, which are connected via a fiber structure 22. A second vacuum insulation element can be provided as a cap for the open side.

The second vacuum insulation element may be substantially in the form of a panel that replicates the outer shape of the missing side. Alternatively, the cap may be a second vacuum insulation element that has substantially the same shape as the first vacuum insulation element but is formed to be slightly larger so that it can be slipped over the first vacuum insulation element. Here, the side walls of the larger vacuum insulation element can completely or partially cover the side walls of the smaller vacuum insulation element.

The vacuum then prevents heat transfer from the inside of the (inner) container to the outside. This form of construction may find application, for example, in buffer storage tanks or also in containers. Preferably, the fiber structure 22 is designed to be stronger in this embodiment, since the fiber structure must additionally bear the static load of the contents.

With the two containers, each opened on one side and pushed one on top of the other, an easily opened device with excellent thermal insulation properties is created. This can be used, for example, as a cooling box. In one embodiment, the limiting parts here are not made of pure metal but of metal-coated fiber laminate.

In the production of the vacuum insulation element according to the invention, the mold is first produced as described, including the seal, and then the enclosed space is evacuated in a known manner to provide a evacuated space 16. In order to improve the quality of the vacuum or to extend the life of the vacuum insulation elements, a getter material can be introduced into the space between the limiting parts 12, 14 which can, for example, bind gas molecules penetrating from the outside over time and thus maintain the vacuum even if the seal deteriorates. The inventors have achieved very good insulation values in the range of $10^{-5}$ W/mK with a vacuum of about 10-4 mbar.

The vacuum insulation element according to the invention can replace the support core of conventional vacuum insulation panels, which up to now has usually been made of fumed silica, with a simple construction that can be made largely of metal. This can significantly reduce the primary energy requirement during production. Production also becomes more cost-effective. In addition, if metal foils are used in the edge area, the diffusion tightness and resistance of the edge can be significantly improved. This enables a long service life and simplifies handling of the insulation material.

Although specific embodiments have been shown and described, it will be understood by one of ordinary skill in the art that a variety of alternative and/or equivalent implementations may be substituted for the specific embodiment shown and described without departing from the fundamental idea of the present invention. The present application is intended to cover any adaptations or variations of the specific embodiments discussed herein.

What is claimed is:

1. A thermal vacuum insulation element comprising:
   a first planar limiting part and a second planar limiting part spaced apart from one another and defining an evacuated space between them;
   means for sealing the evacuated space;
   first support elements extending away from the said first limiting part into the said evacuated space and second support elements extending away from the said second limiting part into the said evacuated space, wherein the said limiting parts are arranged with the said support elements in such a way that the first support elements and the second support elements protrude beyond one another and are spaced apart from one another, and wherein the first support elements are spaced apart from the second limiting part, and wherein the second support elements are spaced apart from the first limiting part;
   a fiber structure connecting the first support elements and the second support elements to one another, wherein the fiber structure has a low thermal conductivity and is configured to absorb at least the pressure caused by the vacuum on the first and second limiting parts;
   the fiber structure spanning an edge region limiting the evacuated space, and wherein the limiting parts are configured to be vacuum-tight and the means for sealing the evacuated space comprise an edge film which is welded or bonded to the limiting parts along the edges of the limiting parts, and wherein the fiber structure is perpendicularly guided in the edge region from the first limiting part to the second limiting part.

2. Vacuum insulation element according to claim 1, wherein the fiber structure has a thermal conductivity value of less than 0.06 W/mK.

3. Vacuum insulation element according to claim 1, wherein the fiber structure comprises glass, nylon, hemp, aramid or/and carbon fibers.

4. Vacuum insulating element according to claim 1, wherein the fiber structure is in the form of individual filaments stretched between the support elements.

5. Vacuum insulating element according to claim 1, wherein the fiber structure is formed as a fiber fabric.

6. Vacuum insulation element according to claim 1, wherein at least one of the limiting parts comprises metal, ceramic, glass, laminate, and/or plastic.

7. Vacuum insulation element according to claim 1, wherein at least one of the limiting parts comprises openings.

8. Vacuum insulation element according to claim 1, wherein the limiting parts each form at least one edge or at least one corner.

9. Vacuum insulation element according to claim 8, wherein:
   the first limiting part forms a first edge, the first limiting part comprising a first partial first limiting part and a second partial first limiting part, the first partial first limiting part extending from the edge in a first direction away from the edge and the second partial first limiting part extending from the edge in a second direction away from the edge, the second direction not parallel with the first direction;
   the second limiting part forms a second edge, the second limiting part comprising a first partial second limiting part and a second partial second limiting part, the first partial second limiting part extending from the second edge in s third direction away from the second edge and the second partial second limiting part extending from the second edge in a fourth direction away from the second edge, the fourth direction not parallel with the third direction.

10. Vacuum insulation element according to claim 9, wherein:
    the first direction is parallel with the third direction and the second direction is parallel with the fourth direction.

11. Vacuum insulation element according to claim 1, wherein the first and second support elements are substantially rod-shaped.

12. Vacuum insulation element according to claim 11, wherein the first and second support elements are evenly distributed in rows and columns over the limiting parts.

13. Vacuum insulation element according to claim 1, wherein the first and second support elements are substantially rib-shaped or v-shaped, and extend substantially over an entire extent of the limiting parts.

14. Vacuum insulation element according to claim 1, wherein the first and second support elements comprise guides and/or fixations for the fiber structure.

15. Vacuum insulating element according to claim 1, wherein the fiber structure also spans over an edge region bounding the evacuated space.

16. Vacuum insulation element according to claim 1, wherein the means for sealing the evacuated space comprise a foil bag completely surrounding the limiting parts with the evacuated space located between them.

17. Vacuum insulation element according to claim 1, wherein the limiting parts are formed as cuboids or cylinders open on one side.

18. Thermal insulation container comprising either one of the following (a) and (b): (a) a vacuum insulation element according to claim 17 and a vacuum insulation element formed as a cap for the cuboid or the cylinder according claim 1, or (b) two vacuum insulation elements according to claim 17, which said two vacuum insulation elements are dimensioned such that they can be slid into one another.

19. Vacuum insulation element according to claim 1, wherein the fiber structure is configured as a fabric in the edge region and as a filament between the support elements.

\* \* \* \* \*